(12) United States Patent
Nguyen et al.

(10) Patent No.: US 7,516,212 B2
(45) Date of Patent: Apr. 7, 2009

(54) DEVICE STATUS IDENTIFICATION

(75) Inventors: Ted T. Nguyen, Antelope, CA (US); Daniel E. Ford, Granite Bay, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1102 days.

(21) Appl. No.: 10/761,469

(22) Filed: Jan. 21, 2004

(65) Prior Publication Data

US 2005/0160163 A1 Jul. 21, 2005

(51) Int. Cl.
G06F 15/173 (2006.01)
G06F 15/16 (2006.01)
(52) U.S. Cl. .................................. 709/224; 709/227
(58) Field of Classification Search .......... 709/223, 709/224, 227
See application file for complete search history.

(56) References Cited

U.S. PATENT DOCUMENTS

| | | | |
|---|---|---|---|
| 5,541,911 A * | 7/1996 | Nilakantan et al. .......... 370/422 |
| 5,719,882 A * | 2/1998 | Ellis ........................ 714/749 |
| 5,991,829 A | 11/1999 | Giorgio et al. |
| 6,054,987 A * | 4/2000 | Richardson ................. 715/734 |
| 6,360,258 B1 | 3/2002 | LeBlanc |
| 6,651,085 B1 | 11/2003 | Woods |
| 2003/0009543 A1 * | 1/2003 | Gupta ....................... 709/223 |
| 2003/0061265 A1 * | 3/2003 | Maso et al. ................. 709/105 |
| 2003/0149756 A1 * | 8/2003 | Grieve et al. ............... 709/223 |

* cited by examiner

Primary Examiner—Larry D Donaghue
Assistant Examiner—Brian J Gillis

(57) ABSTRACT

Systems, methods, and device are provided for device status identification. One method embodiment includes transmitting an SNMP message to a device. The method includes opening a socket connection on the device in response to an SNMP error message returned from the device. And, the method includes initiating a time-out function upon opening the socket connection.

31 Claims, 2 Drawing Sheets

DEVICE STATUS IDENTIFICATION

Computing networks can include multiple computing devices such as servers, desktop PCs, laptops, and workstations, among other peripheral devices, e.g., printers, facsimile devices, and scanners, networked together across a local area network (LAN) and/or wide area network (WAN). A LAN and/or WAN uses clients and servers that have network-enabled operating systems such as Windows, Mac, Linux, and Unix. An example of a client includes a user's workstation. The servers can hold programs and data that are shared by the clients in the computing network. Servers come in a wide range of capacities and costs from Intel-based PC servers to mainframes. A printer, facsimile device, and/or scanner can be attached locally to a workstation or to a server and be shared by network users.

Some of the clients on a LAN and/or WAN may be "thinner" than the fully-loaded Windows or Mac machine. For example, diskless and floppy-only workstations have no local storage and retrieve all software and data from the server. Windows terminals are also used, which function only to display results from a central server. LANs and/or WANs can allow workstations to function as a server, allowing users access to data on another user's machine. These peer-to-peer networks are often simpler to install and manage, but dedicated servers provide better performance and can handle higher transaction volume. Multiple servers are used in large networks.

The controlling software in a LAN and/or WAN is the network operating system, e.g., Windows, Mac, Linux, and/or Unix, in the server. A component part can reside in a client and allow an application on the client to read and write data from the server as if it were on the local machine.

A computing device having processor logic and memory, such as the computing devices described herein, includes an operating system layer and an application layer to enable the device to perform various functions or roles. The operating system layer includes a master control program that runs the computing device. As understood by one of ordinary skill in the art, the master control program provides task management, device management, and data management, among others. The operating system layer contains communicates with program applications running thereon through a number of APIs. In other words the APIs include a language and/or message format used by an application program to communicate with the operating system. The language and/or message format of the APIs allow an operating system to interpret executable instructions received from program applications in the application layer and return results to applications.

APIs are implemented by writing function calls in the program, which provide the linkage to the required subroutine for execution. There are more than a thousand API calls in a full-blown operating system such as Windows, Mac, or Unix.

Data transfer between devices over a network is managed by a transport protocol such as transmission control protocol/internet protocol (TCP/IP). The IP layer in TCP/IP, contains a network address and allows messages to be routed to a different network or subnetwork (subnet). The physical transmission is performed by an access method, almost exclusively Ethernet, which is on the motherboard or in the network adapter cards (NICs) plugged into the network devices. The actual communications path is the twisted pair or optical fiber cable that interconnects each network adapter.

Ethernet is a widely used local area network (LAN) access method, defined by the IEEE as the 802.3 standard. Ethernet has become so popular that a specification for "LAN connection" or "network card" generally implies Ethernet without saying so. Network devices can include 10/100 Ethernet ports for home use, not just to create a small home network, but to connect to the Internet via a DSL or cable modem. A 10/100 port means that it supports both 10BaseT at 10 megabits per second (Mbps) and 100BaseT at 100 Mbps.

Ethernet is normally a shared media LAN. All stations on the segment share the total bandwidth, which is either 10 Mbps (Ethernet), 100 Mbps (Fast Ethernet) or 1000 Mbps (Gigabit Ethernet). With switched Ethernet, each sender and receiver pair have the full bandwidth.

Ethernet transmits variable length frames from 72 to 1518 bytes in length, each containing a header with the addresses of the source and destination stations and a trailer that contains error correction data. Higher-level protocols, such as IP, fragment long messages into the frame size required by the Ethernet network being employed. Carrier sense multiple access/collision detection (CSMA/CD) is the LAN access method used in Ethernet. Ethernet uses the CSMA/CD technology to broadcast each frame onto the physical medium (wire, fiber, etc.). When a device wants to gain access to the network, it checks to see if the network is quiet (senses the carrier). If it is not, it waits a random amount of time before retrying. If the network is quiet and two devices access the line at exactly the same time, their signals collide. When the collision is detected, they both back off and each wait a random amount of time before retrying. All stations attached to the Ethernet are "listening," and the station with the matching destination address accepts the frame and checks for errors. Ethernet is a data link protocol, e.g., media access control (MAC) layer protocol and functions at layers 1 and 2 of the open system interconnection (OSI) model.

As mentioned above, network devices in a LAN and/or WAN include hardware components, such as trunk lines, switches, routers, hubs, servers, and databases. LANs and/or WANs can also include software, application modules, firmware, and other computer executable instructions operable thereon.

Network devices such as switches, hubs, and routers, for example, are used to distribute and restrict traffic within workgroups of a network. Network devices can also provide filtering of inter or intra network traffic for security purposes and policy management. These sorts of network device functionality can also be incorporated into other devices within a network environment, such a file server, a load balancing device or other such network appliance.

Any number of network devices, such as those mentioned above, may be included in a network. In some situations, network devices can go offline or malfunction. For example, during a power outage a network device may lose power and the network connection is lost. Additionally, a network device can become overloaded with information and can shut itself down to protect itself or can be overwhelmed by the information such that the network device becomes "frozen" or "crashes". In such cases, the data in transit through the network device can be lost.

Managing network communication between network devices in the network can be provided by various network protocols including, but not limited to, simple network management protocol (SNMP), common management information protocol (CMIP), distributed management environment (DME), telnet protocol, and internet control message protocol (ICMP) to name a few. ICMP is a TCP/IP protocol used to send error and control messages. A network device may use ICMP to notify a sender that its destination node is not available. For example, a ping utility sends ICMP echo requests to verify the existence of an IP address. The ping is used to identify the status of a network device, e.g., whether the network device is up or down.

A socket connection, as the same are known and understood by one of ordinary skill in the art, provides an access connection to a computing device. For example, a socket connection can provide an access point for commands and program instructions to take control of a computing device and/or to perform device diagnostics. Opening a socket on a computing device involves the use of an appropriate application program interface (API) for the device, e.g., an API that is native to the operating system (OS) of the computing device and/or computing device network. Hence, a Windows OS environment will use a Windows appropriate API, a Unix OS environment will use a Unix appropriate API, a Linux OS will use a Linux appropriate API and so forth. Even ICMP using TCP/IP involves the use of a native interface, e.g., in C+. Providing multiple APIs written for different operating systems on a single machine, e.g., network management station PC, and/or network can pose an issue where the multiple operating system versions of the APIs may interfere with one another and possibly cause a device to crash.

DETAILED DESCRIPTION

Figure 1:
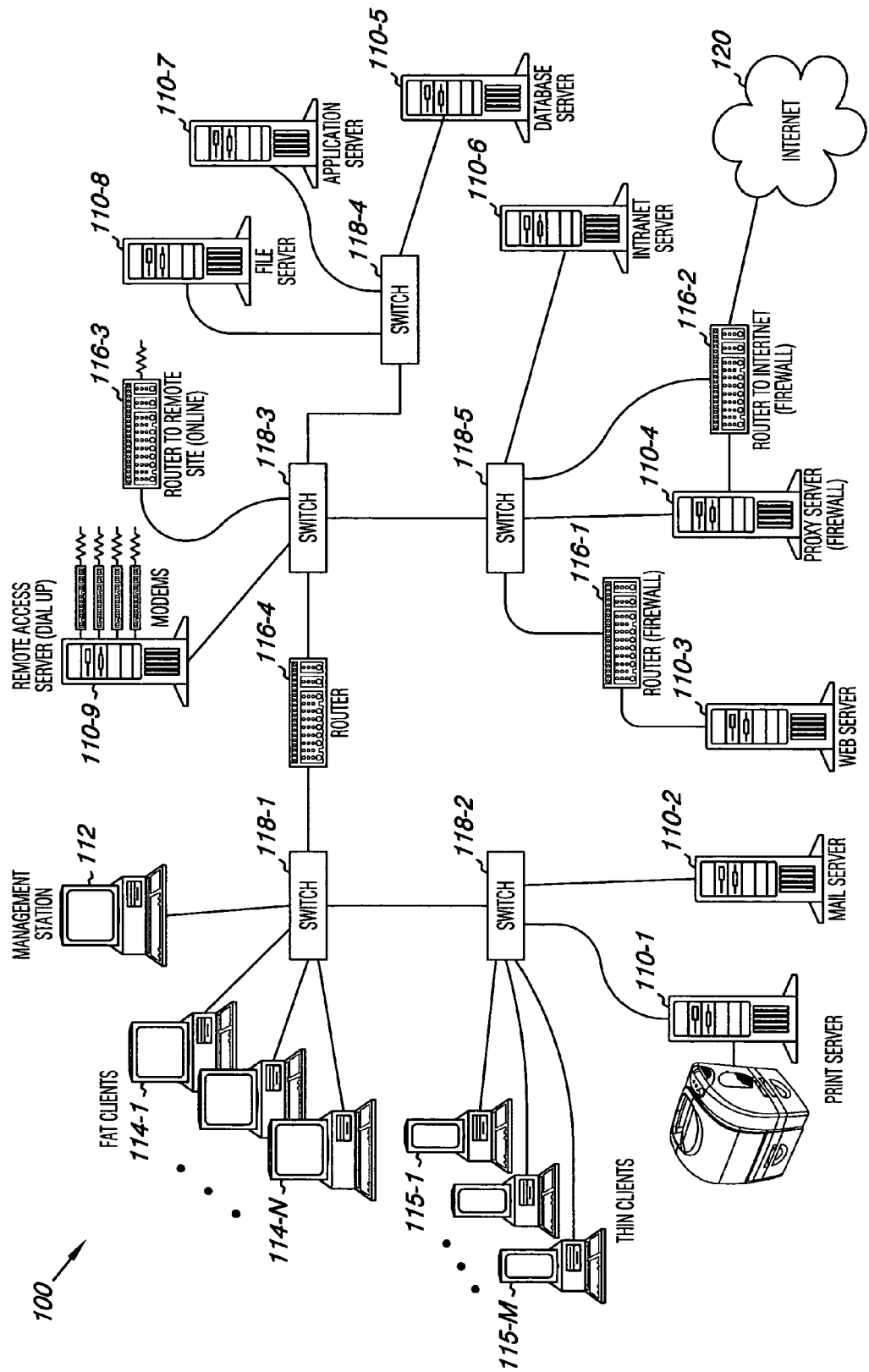
FIG. 1 is an embodiment of a computing device network.

Most network management applications use ICMP to identify whether a device is up or down. ICMP is very fast, but it is platform dependent which involves the use of a native API interface to be developed for each platform being supported. In cases where ICMP is not an appropriate solution, due to the fact that the platform on which the network management application will run is not known in advance or because providing different native interfaces may cause the application to crash, an alternative solution is provided by the embodiments. The embodiments instead use the platform independent function call in Java to determine a device status. Various embodiments use a Java function call to open a socket connection to a device whose status is being polled and if the call returns a success message, then the device is up, and if the call returns an error message, then the device is down. However, it is recognized that opening a socket connection can involve a lot more system resources and more time to execute than using ICMP. As such, various embodiments combine the use of SNMP requests and a platform independent socket connection call, e.g., in JAVA, together with a time-out function in order to achieve performance comparable to ICMP but which is platform independent. These embodiments recognize that most devices in a network are normally up and only a few are down. The performance benefit for this solution is appreciable in a network where hundreds or thousands of devices are to be polled and monitored.

Embodiments of the present invention provide a platform independent device status identification method. In various embodiments a SNMP protocol is used first to determine a status of a device without having to use ICMP pings. SNMP messages, which are platform independent, are sent to various devices on connected over a network. If in response to sending the SNMP message a device returns an error message, then an API function call, written in a platform independent language, e.g., Java, is used to open a socket connection on the device. An IP address and a port number for the socket connection are provided for use by the API function call. Embodiments include initiating a time-out function upon opening the socket connection. The device status is indicated based on successful SNMP message requests, e.g., no return error message, or the expiration of a time period associated with a time-out function from opening the socket connection. That is, a program opening the socket connection typically receives a return response from a functioning, "up" device within a matter of a few seconds, e.g., 1 to 2 seconds. In contrast, in the case of a non-functioning, "down" device the program which opened the socket connection may not receive a return response until a measurable greater period of time has elapsed, e.g., 10 seconds. By use of an appropriate time-out function, the program embodiments do not need to wait the longer time period for a return response before indicating a device's status. An appropriate time period for the time-out function can be selected as suited to a device and/or network. In this manner, a quick and efficient and platform independent technique for device status identification is provided.

FIG. 1 is an embodiment of a computing device network 100. As shown in FIG. 1, a number devices can be networked together via a LAN and/or WAN via router, hubs, switches and the like. The embodiment of FIG. 1 illustrates client and servers in a LAN. However, embodiments of the invention are not so limited. The embodiment shows one server for each type of service on a LAN. However, in practice several functions can be combined in one device or machine and, for large volumes, multiple devices or machines can be used to balance the traffic for the same service. For example, an enterprise system or network can include a collection of servers, or server farm, cooperating to provide services to the network.

Thus, FIG. 1 illustrates a print server 110-1 to handle print jobs for the network 100, a mail server 110-2, a web server 110-3, a proxy server (firewall), a database server 110-5, and intranet server 110-6, an application server 110-7, a file server 110-8, and a remote access server (dial up) 110-9. Again, the examples provided here do not provide and exhaustive list. The embodiment of FIG. 1 further illustrates a network management station 112, e.g., a PC or workstation, a number of "fat" clients as the same have been described above, which can also include PCs and workstations and/or laptops, and a number of "thin" clients as the same have been described above, which can include terminals and/or peripherals such as scanners, facsimile devices, handheld multifunction device, and the like. The embodiment of FIG. 1, illustrates that all of these illustrative devices can be connected to one another and/or to other networks via routers, 116-1, 116-2, 116-3, and 116-4, and hubs and/or switches 118-1, 118-2, 118-3, 118-4, and 118-5, as the same are know and understood by one of ordinary skill in the art. Embodiments of the invention, however, are not limited to the number and/or quantity of devices number in FIG. 1's illustration.

As one of ordinary skill in the art will appreciate, many of these devices include processor and memory hardware. By way of example and not by way of limitation, the network management station will include a processor and memory as the same are well know to one of ordinary skill in the art. Embodiments of the invention are not limited, for the various devices in the network, to the number, type or size of processor and memory resources. Program applications (e.g., computer executable instructions) can reside on a network management station to manage and/or monitor a network.

As described above, managing and/or monitoring a network can include a program application employing a protocol to poll the status of the various devices connected to the network 100, e.g. a network status polling program application. Each of the example devices can include a network port to receive a polling query from the polling program application.

According to embodiments of the present invention, the program application employs simple network management protocol (SNMP) to send the polling queries, e.g., SNMP messages, to devices connected to the network 100. As one of ordinary skill in the art will appreciate, data can be passed from SNMP agents, which are hardware, firmware, and/or software processes, or combinations thereof, reporting activity in each network device (e.g., hub, server, peripheral, router, workstation, laptop, etc.) to the management workstation 112. The agents can return information contained in a management information base (MIB).

As noted above, the SNMP queries data from a given device in the network 100. In the present embodiments, a network administrator may not be interested in the return of all of the data in the MIB and/or the time it would take to return all of this data. Instead, the network administrator may simply want to quickly ascertain the status of various devices in the network, e.g., whether a given device "up and functioning" or "down and non-functioning". As noted earlier, SNMP is platform independent. In the various embodiments of the present invention, the SNMP polling program application is used in connection with quickly ascertaining a status, up or down, of a device. That is, in the various embodiments a network administrator, for example, applies the SNMP polling program to assess and confirm the status of a device along with the SNMP's ability to query available MIB data. In one example embodiment, and as will be explained in more detail below, a polling program application together with SNMP messaging capabilities is provided to the network management station 112 and is applied to confirm a status, "up" or "down" of various devices attached to the network.

It is recognized that in normal network operations most of the polling queries will be returned positive, e.g., a particular polled device is "up." This is true whether using platform independent SNMP, platform dependent ICMP pings or otherwise. Thus, the various polling program embodiments of the present invention may not encounter any status identification issue for a large number of the network devices polled. However, it is recognized that there will be instances where in response to sending the SNMP message a device returns an error message. For example, the SNMP may not have a correct password, IP address, community name, and/or port number for a given device in the network 100. In these instances a returned error message, which can be a standard or generic error message, may not provide a true indication that a device is down, but rather be a result of having an incorrect password, IP address, community name, and/or port number, etc.

Accordingly, the various program embodiments include providing a platform independent function call to the polling program application. The platform independent function call can execute instructions to open a socket connection, as the same are know and understood by one of ordinary skill in the art, on the particular polled device which responded with an error message. One example of a platform independent function call includes a Java based function call. As one of ordinary skill in the art will appreciate upon reading this disclosure Java based applications are platform independent and Java supports SNMP.

The various devices attached to the network 100 can have their socket connection's IP address and port number mapped within the network 100, e.g., mapped to the network management station and stored in memory directory or database on the network management station or elsewhere at a know location in a distributed network. One of ordinary skill in the art will appreciate the manner in which an IP address and a port number of a socket connection can be mapped within a network, e.g., according to network device connection routines, as devices are connected to the network. The polling program embodiments include instructions which can execute to retrieve the correct IP address and correct port number to open the socket connection on the particular polled device which responded with an error message. Thus, in those instances where an error message is returned in response to the SNMP polling query, the platform independent function call executes to open the socket connection.

Additionally, the various polling program embodiments are provided with instructions which execute to perform a "time-out" function upon opening the socket connection. That is, once the socket connection has been opened on the particular polled device which originally responded with an error message to the SNMP query, the instructions execute to commence a timer as part of the time-out function. As one of ordinary skill in the art will appreciate, once a socket connection is opened the program which opened the socket connection, whether on the network management station or otherwise, will typically receives a return response from a functioning, "up" device within a matter of a few seconds, e.g., 1 to 2 seconds. In contrast, in the case of a non-functioning, "down" device the program which opened the socket connection may not receive a return response until a measurable greater period of time has elapsed, e.g., 10 seconds.

According to the various embodiments, the polling program is provided with a time out period or threshold set somewhere between the return response time expectation from an "up" device and the return response time expectation from a "down" device. The program instructions execute to determine whether the return response from opening the socket connection is received within the established time out period. By way of example and not by way of limitation, a time out period is set at 2-3 seconds from opening the socket connection. However, embodiments are not limited to this time frame example. One of ordinary skill in the art will appreciate that various time frames, or time-out thresholds can be provided to the polling program embodiments as suitable to a particular network environment.

By application of the above polling program applications, in those instances where an error message is returned in response to the platform independent SNMP polling query, a platform independent function call is executed to open the socket connection and initiate the time-out function. As will be discussed in more detail below, the polling program instructions execute to indicate a device status based on successful SNMP requests or a time-out from opening the socket connection. In the various embodiments, the polling program executes instructions to indicate a given device is "up" when a response is returned within the established time out period from opening the socket connection. Conversely, the time-out function will generate a "time-out" failure message when a response is not returned within the established time out period from opening the socket connection. In these instances the polling program executes instructions to indicate that a given device is "down".

In this manner the receipt of two error messages, a first return error message in response to the SNMP message and a second return error message from the time out failure, serves as the basis for the program instructions to indicated that the particular device is down. Additionally, the polling program embodiments have enabled this determination to be made in an expedient and platform independent fashion. Successful SNMP requests will not generate the first return error. Accordingly, in these instances the device will naturally be reflected as being "up".

Thus, the polling program embodiments combine the use of platform independent SNMP request messages, the use of a platform independent function call for opening a socket connection, e.g., a Java function call, and the use of a time-out function to provide a quick and efficient device status identification technique. The polling program embodiments use the platform independent function call to open the socket of the particular polled device when an error message in response to the SNMP request. The use of a Java function call to open a socket connection is complementary to using the SNMP return error message as the first trigger in the "two return error" test formula since Java applications support SNMP.

One of ordinary skill in the art will appreciate the manner in which polling program embodiments, as described herein, can be provided to the network. One example includes providing an automatic software and/or firmware update to a device on the network 100 such as the network management station. Embodiments, however, are not limited to this example. One of ordinary skill in the art will further appreciate that icons can be presented on a display of such a network management station where each icon represents a particular device which has been attached and mapped to the network. Program embodiments, as described herein, can further include instructions which can execute to visually indicate in association with each particular device icon whether the above described "two return errors" evaluation reveals that a particular device is up or down. For example, a particular device icon can be represented in green, indicating the device is "up", when the no first return error message is received from an SNMP request and when a first return error message is received but a second error message, e.g., a time-out failure message, is not received. The icon can be represented in red when both a first return error message is received from an SNMP request and when a second error message, e.g., a time-out failure message, is also received. Embodiments, however, are not limited to this particular visual indication example.

Figure 2:
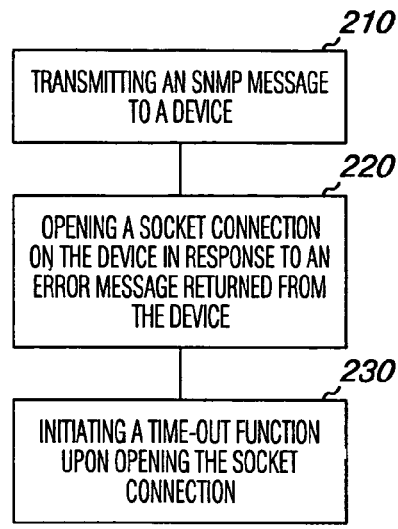
FIGS. 2-3 illustrate various method embodiments for network device status identification.
Figure 3:
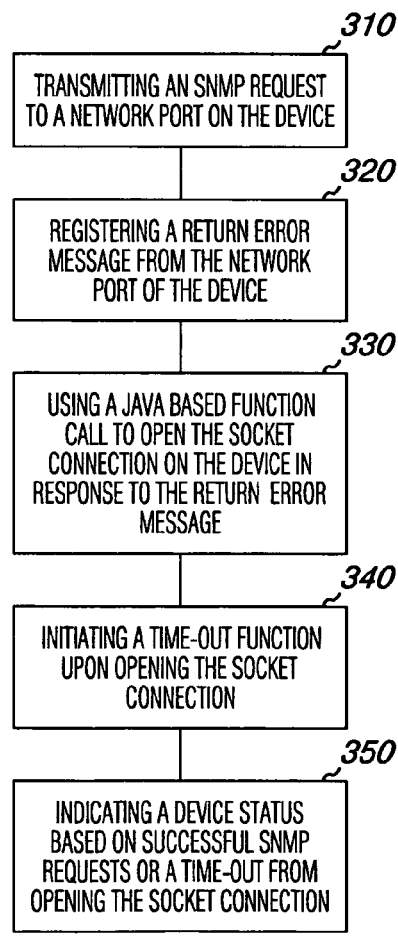

FIGS. 2-3 illustrate various method embodiments for device status identification. As one of ordinary skill in the art will understand, the embodiments can be performed by software, application modules, and computer executable instructions operable on the systems and devices shown herein or otherwise. The invention, however, is not limited to any particular operating environment or to software written in a particular programming language. Software, application modules and/or computer executable instructions, suitable for carrying out embodiments of the present invention, can be resident in one or more devices or locations or in several and even many locations.

Unless explicitly stated, the method embodiments described herein are not constrained to a particular order or sequence. Additionally, some of the described method embodiments can occur or be performed at the same point in time.

FIG. 2 illustrates a method embodiment associated with device status identification. In the embodiment of FIG. 2, includes transmitting an SNMP message to a device as shown in block 210. The device can be coupled to a network management station over a LAN and/or WAN, among others. The SNMP is transmitted to a network port on the device. In various embodiments, a network management station includes a polling program application, as described herein, to transmit an SNMP message to the network attached device. According to the embodiments described herein, a polling program application will use the SNMP messages together with a platform independent function call for opening a socket connection, e.g., a Java function call, and the use of a time-out function to provide a quick and efficient device status identification technique. As noted above, in many instances of normal network operations most of the SNMP requests will be successful, e.g., will not return an error message. As described above, polling program embodiments will register successful SNMP requests as indicating that a particular polled device is "up."

In some instances, however, an SNMP request may return an error message to the program which sent the SNMP request. For example, an error message may be returned if the SNMP request does not have a correct password, IP address, community name, and/or port number for a given network attached device to which the request was sent. In these instances the return error message, which can be a standard or generic error message, does not distinguish to indicate whether the error message is due to the device being down or due to the SNMP request having an incorrect password, IP address, community name, and/or port number, etc for the device.

In block 220, the method includes opening a socket connection on the device in response to an SNMP error message returned from the device. Opening the socket connection on the device includes using a platform independent function call to open the socket connection on the device. The socket connection can be located using an IP address and port number for the device. The IP address and port number can be physically entered and stored in memory by a network administrator as devices are connected to the network and/or can include automatic mapping program applications which execute instructions to map a device's connection information to the network as the device is connected to the network. One of ordinary skill in the art will appreciate the manner in which a program can execute to retrieve and store the IP address and port number information.

In various embodiments, the platform independent function call is a Java based function call. As noted above, Java applications are platform, e.g., operating system, independent applications and Java applications support the use of SNMP. The platform independent function call can execute instructions which use the appropriate IP address and port number to open the socket connection of the device which responded with the SNMP error message.

In block 230, the method includes initiating a time-out function upon opening the socket connection. For example, once the socket of the particular device has been opened, the program instructions can execute to commence a timer as part of the time-out function. As described above, once a socket connection is opened the program which opened the socket connection, whether on the network management station or otherwise, will typically receives a return response from a functioning, "up" device within a matter of a few seconds, e.g., 1 to 2 seconds. In the case of a non-functioning, "down" device the program which opened the socket connection may not receive a return response until a measurable greater period of time has elapsed, e.g., 10 seconds. The various embodiments include a program which is provided with a time out period or threshold set somewhere between the return response time expected from an "up" device and the return response time expected from a "down" device. The program instructions execute to determine whether the return response from opening the socket connection is received within the established time out period, e.g. within 2-3 seconds. If a return response is not received within this time frame, the program instructions execute to generate a time-out failure message. Hence, the program embodiments can indicate a down status for a device based on receipt of two error messages, one from the original SNMP request and another from the time-out function. In various embodiments, the program instructions execute to indicating the device is down by displaying a colored-coded icon associated with the polled device, e.g., presented on a display of a network management station. If a return response is received with the time out period, the program instructions will indicate an up status for the device. Additionally, a color-coded icon can be used to indicate the device is up in the manner described above. The program instructions further allow a network administrator to select a time out period in connection with the time-out function as suited to a particular network environment.

FIG. 3 illustrates another method embodiment for device status identification. In the embodiment of FIG. 3, the method includes transmitting an SNMP message to a network port on the device as shown in block 310. Transmitting the SNMP message can be performed in the same manner as has been described above in connection with FIGS. 1 and 2. In block 320, the method further includes registering a return error message from the network port of the device. As described above, the return error message may be in response to the SNMP message having an incorrect password, IP address, community name, and/or port number, etc, and does not definitively indicate that a given device is down.

In block 330, a Java based function call is used to open a socket connection on the device in response to the return SNMP error message. A Java based function call, or other platform independent function call, can execute instructions to open the socket connection on the particular device in the same manner as has been described above in FIGS. 1 and 2.

In block 340, the method further includes initiating a time-out function upon opening the socket connection. As described above, initiating a time-out function includes program instructions which execute to commence a timer once the socket connection of the particular device has been opened. Again, a selectable time out period can be established for the time-out function as suited to a particular network environment, e.g., a time out period of 2-3 seconds from opening the socket connection.

In block 350, the method further includes indicating a device status based on successful SNMP requests or a time out from opening the socket connection. According to the various embodiments, to indicate a device status the program instructions execute to register successful SNMP requests, e.g. an SNMP request which does not return an error message, as an indication that a device is up. As described in block 330, when an SNMP error message is returned the program uses a Java based function call to open the socket connection on the device and further initiates the time-out function as described in block 340. The program instructions execute to additionally use this time-out function in indicating the device status. That is, if a return message is registered by the program within a time out period from opening the socket connection, then the program again executes instructions to indicate the device is up. However, if a return message is not received by the program within this time period a time out error message will be generated by the program. The program instructions execute to register this time out error message as indicating the device is down. Thus, the program embodiments employ a two error message test before indicating that a device is down, the first error being an SNMP error message returned from the SNMP request and the second error message being the time out failure message.

The combined use of platform independent SNMP request messages, platform independent function calls, e.g., Java function calls, for opening a socket connection make this technique a platform independent approach to device status identification. And, the additional use of a time-out function makes this technique a quick and efficient. Java function calls are complementary to the use of SNMP messages in this "two return error" test as Java applications support SNMP.

One of ordinary skill in the art will appreciate the manner in which polling program embodiments, as described herein, can be provided to the network. One example includes providing an automatic software and/or firmware update to a device on the network 100 such as the network management station. Embodiments, however, are not limited to this example. One of ordinary skill in the art will further appreciate the manner in which icons can provide the visual device status identification. That is, such icons can be presented on a display of a network management station with each icon representing a particular device on the network. Program embodiments execute, according to the methods which have been described herein, to visually indicate whether a particular device is up or down. For example, a particular device icon can be represented in green, indicating the device is "up", for successful SNMP requests and also when, although an SNMP error message has been received, a time-out failure message has not. Likewise, a particular device icon can be represented in red when an SNMP error message is received and a time-out failure message is also received. Embodiments are not limited to the particular visual indication examples given herein.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the invention. It is to be understood that the above description has been made in an illustrative fashion, and not a restrictive one. Combination of the above embodiments, and other embodiments not specifically described herein will be apparent to those of skill in the art upon reviewing the above description. The scope of the various embodiments of the invention includes any other applications in which the above structures and methods are used. Therefore, the scope of various embodiments of the invention should be determined with reference to the appended claims, along with the full range of equivalents to which such claims are entitled.

In the foregoing Detailed Description, various features are grouped together in a single embodiment for the purpose of streamlining the disclosure. This method of disclosure is not to be interpreted as reflecting an intention that the embodiments of the invention require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A network management station, comprising:
a processor;
a memory coupled to the processor; and
program instructions provided to the memory and executable by the processor to:
transmit an SNMP message to a device connected to the management station over a network;
open a socket connection on the device in response to an SNMP error message returned from the device;

initiate a time-out function upon opening the socket connection; and indicate a status of the device based on successful SNMP messages and the time-out function.

2. The network management station of claim 1, wherein the program instructions include a platform independent function call to execute instructions which open the socket connection.

3. The network management station of claim 2, wherein the platform independent function call is a Java based function call.

4. The network management station of claim 1, wherein the SNMP error message includes a generic error message.

5. The network management station of claim 1, further including program instructions which can execute to selectably establish a time period in connection with the time-out function based on input from a network administrator.

6. The network management station of claim 1, wherein the program instructions execute to indicate a device is down when both the SNMP error message and a time-out failure message are received.

7. The network management station of claim 1, wherein the device and the station are connected over a local area network (LAN).

8. The network management station of claim 1, wherein the device and the station are connected over a wide area network (WAN).

9. A network management station, comprising:
a processor;
a memory coupled to the processor; and
program instructions provided to the memory and executable by the processor to:
send an SNMP request to a device connected to the management station over a network;
register a return error message to the SNMP request from device;
execute a Java based function call to open a socket connection on the device in response to the return error message;
initiate a time-out function upon opening the socket connection; and
indicate a device status based on successful SNMP requests and the time-out function.

10. The network management station of claim 9, wherein the program instructions execute to indicate the device status is up upon receiving successful SNMP requests.

11. The network management station of claim 9, wherein the program instructions execute to indicate the device status is up when:
a return error message to the SNMP request is registered by the program instructions; and
a response is received by the program instructions prior to an expiration of the time-out function.

12. The network management station of claim 9, further including program instructions to selectably establish a time-out period in association with the time-out function.

13. The network management station of claim 12, wherein the program instructions execute to indicate the device status is down when:
a return error message to the SNMP request is registered by the program instructions; and
a time-out failure message associated with the time-out function is received by the program instructions.

14. A method for device status identification, comprising:
transmitting an SNMP message to a device;
opening a socket connection on the device in response to an SNMP error message returned from the device;
initiating a time-out function upon opening the socket connection; and
indicate a status of the device based on successful SNMP messages and the time-out function.

15. The method of claim 14, further including using a platform independent function call to open the socket connection on the device.

16. The method of claim 15, further including using a Java based function call to open the socket connection on the device.

17. The method of claim 14, further including establishing a time out period in association wit the time-out function.

18. The method of claim 17, further including indicating the device is down upon:
registering the SNMP error message; and
receiving a lime-out failure message associated with the time-out function.

19. The method of claim 18, further including visually indicating the device is down using a colored icon.

20. The method of claim 14, further including indicating the device is up upon receiving successful SNMP requests.

21. The method of claim 14, further including indicating the device is up upon:
Registering the returned SNMP error message to the transmitted SNMP message; and
receiving a response prior to an expiration of the time-out function upon opening the socket connection.

22. A method for device status identification, comprising:
sending an SNMP request to a device;
registering a return error message from the device in response to the SNMp request;
executing a Java based function call to open a socket connection on the device in response to the return error message;
initiating a time-out function upon opening the socket connection; and
indicating a device status based on successful SNMP requests and the time-out function.

23. The method of claim 22, further including indicating a device is up if a message is returned from the socket connection of the device prior to an expiration of the time-out function.

24. The method of claim 22, further including indicating a device is down if no message is returned from the socket connection of the device prior to an expiration of the time-out function.

25. A computer readable medium having instructions for causing a device to perform a method, comprising:
transmitting an SNMP message to a device on a network;
opening a socket connection on the device in response to an SNMP error message returned from the device;
initiating a time-out function upon opening the socket connection; and
indicating a status of the device based on successful SNMP messages and the time-out function.

26. A network management station, comprising:
a processor;
a memory coupled to the processor;
means for determining a status of a device connected to the management station over a network in a platform independent manner; and
wherein the means includes program instruction which execute to send a simple network management protocol (SNMP) request to the device;

wherein the means includes program instruction which execute to open a socket connection on the device in response to an ANMP error message returned from the device;

wherein the means includes program instruction which execute to initiate a time-out function upon opening the socket connection; and wherein the means includes program instruction which execute to indicate a status of the device based on successful SNMP messages and the time-out function.

27. The network management station of claim 26, wherein the means includes program instruction which execute to register successful SNMP requests as an up status for the device.

28. The network management station of claim 26, wherein the means includes program instructions which execute to register an up status for the device when:

a return error message to an SNMP request is received by the program instructions; and a response message associated with opening a socket connection on the device is received by the program instructions prior to an expiration of a time-out function.

29. The network management station of claim 26, wherein the means includes program instructions which execute to register a down status for the device when:

a return error message to an SNMP request is received by the program instructions; and a time-out failure message associated with a time-out function is received by the program instructions.

30. The network management station of claim 26, wherein the means includes program instructions having a platform independent function call to execute instructions which open a socket connection on the device.

31. The network management station of claim 30, wherein the platform independent function call is a Java based function.

* * * * *